United States Patent [19]

Mellott

[11] 4,392,698
[45] Jul. 12, 1983

[54] INDUSTRIAL CRANE WITH ROTARY ELECTRICAL CONNECTOR

[75] Inventor: Lex A. Mellott, Warfordburg, Pa.

[73] Assignee: JLG Industries Inc., McConnellsburg, Pa.

[21] Appl. No.: 221,389

[22] Filed: Dec. 30, 1980

[51] Int. Cl.³ ............................................ H01R 39/02
[52] U.S. Cl. ..................................... 339/10; 339/5 R; 180/6.58
[58] Field of Search ............. 339/5 R, 5 M, 6 R, 8 R, 339/10, 16; 180/6.58; 212/253; 191/9

[56] References Cited

U.S. PATENT DOCUMENTS

| | | | |
|---|---|---|---|
| 1,481,729 | 1/1924 | Nafziger | 191/9 |
| 1,604,619 | 10/1926 | Turner | 191/9 |
| 1,809,981 | 6/1931 | Lexa et al. | 191/9 |
| 2,135,835 | 11/1938 | Papello | 339/5 R |
| 2,424,650 | 7/1947 | Dickerman | 339/8 R X |
| 2,725,540 | 11/1955 | Scott | 339/5 P |
| 4,177,869 | 12/1979 | Crabiel | 180/6.58 |

Primary Examiner—Eugene F. Desmond
Attorney, Agent, or Firm—I. A. Lavine; R. B. O'Planick

[57] ABSTRACT

A vehicle having a chassis and a rotatable upper works is provided with a cylindrical electrical connector mounted remote from the axis of rotation of the upper works, to provide adequate ground clearance.

12 Claims, 4 Drawing Figures

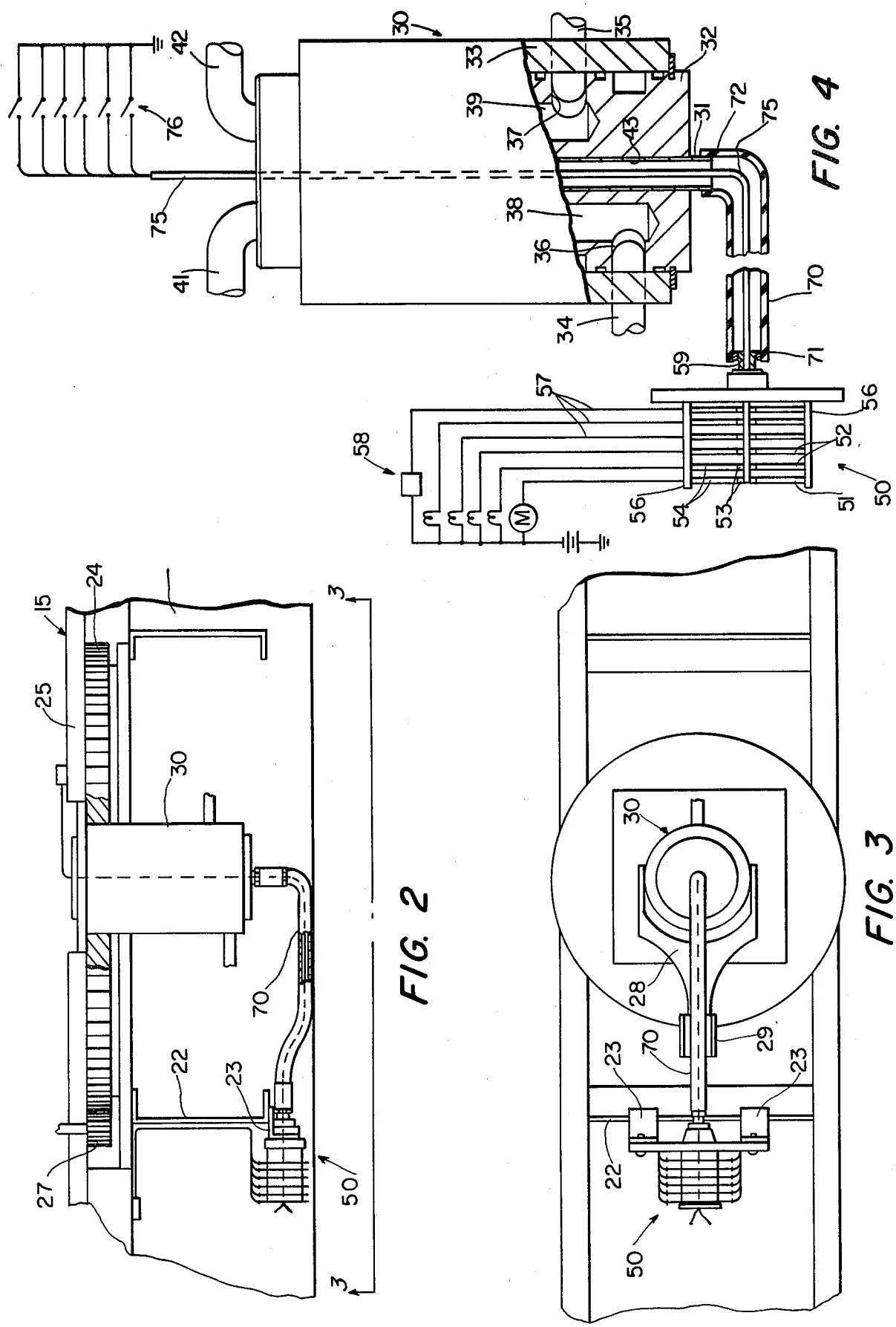

INDUSTRIAL CRANE WITH ROTARY ELECTRICAL CONNECTOR

BACKGROUND OF THE INVENTION

The present invention relates to an Industrial Crane having an upper works rotatably mounted on a wheeled chassis.

Cranes have been developed and include many types, including cranes known as Industrial Cranes. Such cranes are used to pick up a heavy load and to transport the load to a different location, where the load is deposited. Industrial Cranes generally include a chassis supported by four rubber-tired wheels, the chassis including a bearing on which is mounted a rotatable upper works. The upper works is rotated, for example, by gearing, and includes a cab and a boom. The cab includes a seat for the operator, vehicular controls for controlling the propelling, steering and stopping of the vehicular chassis, and also includes crane controls for rotating the upper works about a vertical axis, for raising and lowering the boom, for extending and retracting the boom, and for operating a winch for the load cable. The power source for the Industrial Crane is typically an internal combustion engine, which may be placed either on or in the upper works, or on or in the chassis.

In a typical Industrial Crane, it is necessary to provide electrical circuits which extend from electrical components on or in the upper works to electrical components on or in the chassis. For example, in the operator's cab there may be switches which control lights mounted on the chassis. Typically, there are a plurality of electrical circuits which must extend between the upper works and the chassis and it is known to have, for example, six such separate circuits.

In order to permit the continuous operation of the Industrial Crane without interruption of the electrical circuits, there has been used an electrical connector of the "slip ring" type. Such electrical connectors are cylindrical, and have a plurality, for example six, axially spaced conductor bands provided on a rotary part of the connector, and contacts or "wipers" for engaging the conductor bands, which are stationary.

The above described electrical connector has been mounted on Industrial Cranes, and on similar industrial equipment, at the bottom of the swivel joint or bearing construction, or rotary hydrualic connector, as the case may be, extending therebelow, and being on the axis of the rotary bearing which supports the upper works. In known Industrial Cranes, for example, there have been provided a swivel joint assembly including a rotary oil coupling with the electrical connector below and coaxial with the rotary oil coupling and with the rotary bearings. The rotary oil coupling has been provided in order to provide a rotary connection for hydraulic oil between hydraulic elements in or on the upper works and in or on the chassis.

The placement of the electrical connector in the position noted is shown, for example Crabiel U.S. Pat. No. 4,177,869, Lexa Et Al. U.S. Pat. No. 1,809,981 and Turner U.S. Pat. No. 1,604,619. The foregoing patents are directed to cranes and construction machinery.

In all of the above described apparatus, the electrical connector has extended below the lowest part of the swivel joint, and in present day electrical connectors, this extension has been approximately five inches below the rotary oil coupling of the swivel joint. It has now been recognized that such an extension is undesirable, where the Industrial Crane is to satisfy the requirements of providing a boom and other supports of sufficient strength to support a desired load, to be of relatively low overall height, and to have a suitable ground clearance for the vehicular chassis, meaning that the vehicular chassis is able to transverse uneven ground with bumps. An example is the necessity for an Industrial Crane to travel up a ramp, and then move onto a level surface at the upper end of the ramp.

The cylindrical type electrical connectors above described, in which the conductor bands are arranged axially on a cylinder, are not the only type of electrical connectors known. There are known, also, a flat type of electrical connector in which the conductor bands are provided as concentric rings. Such electrical conductors are sometimes designated as the "pancake" type, and examples of them are shown in Nafziger U.S. Pat. No. 1,481,729, Dickerman U.S. Pat. No. 2,424,650 and Scott U.S. Pat. No. 2,725,540. However, flat or pancake electrical connectors are many times more expensive than are the cylindrical type electrical connectors.

SUMMARY OF THE INVENTION

The present invention provides an Industrial Crane, or similar apparatus having a vehicular chassis and a rotatable upper works, and an electrical connector which is placed at a location on the chassis which is spaced from the axis of rotation of the upper works. A hollow, flexible shaft has one end connected to a rotary part of the swivel, particularly the rotary oil coupling, on the axis of rotation, and has its other end connected to the rotary part of the cylindrical electrical connector. The electrical conductors, which are flexible, extend through the swivel joint, specifically through the rotary oil coupling, and thence through the hollow flexible shaft, and into the electrical connector, where they are connected in normal fashion to contacts for the conductor bands of the cylindrical electrical connector.

Among the objects of the present invention are to provide an Industrial Crane, or similar apparatus having a vehicular chassis and rotatable upper works, which is of relatively low overall height, and which has good ground clearance, without requiring an expensive electrical connector.

BRIEF DESCRIPTION OF THE DRAWING

FIG. 2 is an enlarged view, with parts broken away, of a portion of the Industrial Crane shown in FIG. 1.

FIG. 3 is a view taken on the line 3—3 of FIG. 2.

FIG. 4 is a view with parts broken away, partly in section and partly schematic, illustrating the present invention subject matter.

DESCRIPTION OF THE PREFERRED EMBODIMENT

Figure 1:
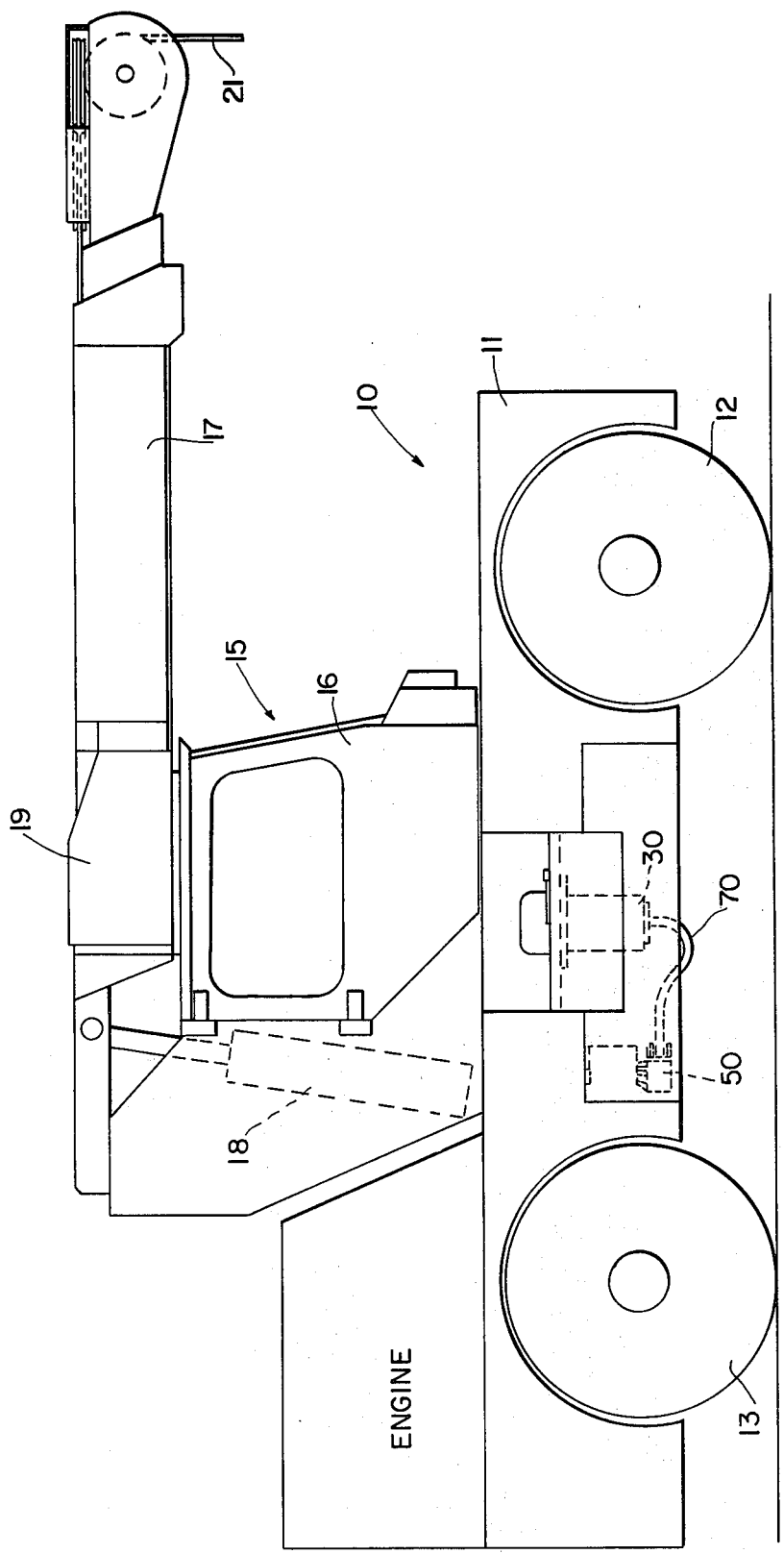
FIG. 1 is an elevational view of an Industrial Crane in accordance with the present invention.

Referring now to the drawings, wherein like or corresponding reference numerals are used to designate like or corresponding parts throughout the several views, there is shown in FIG. 1 an Industrial Crane generally designated 10, and including a chassis 11, which is of the vehicular type, and which is supported by front wheels 12 and rear wheels 13. Either or both of the front wheels 12 and rear wheels 13 may be both powered and steered, as is conventional. Mounted on the chassis 11 is an upper works generally designated 15, and which includes an operator's cab 16, a telescopic boom 17, and a boom lift cylinder 18. The operator's cab 16 will include controls for the vehicular chassis 11, such as controls for starting an engine (not shown) carried in the chassis 11, for steering and driving the vehicular chassis 11, and for stopping it. The operator's cab 16 will also include controls for effecting rotation of the upper works 16 on a vertical axis, for raising and lowering the boom 17, for extending and retracting boom 17, and for operating a winch which is carried in a winch compartment 19, and which effects movement of a cable 21, for supporting a load. The construction of an Industrial Crane, as described above, is, in general, known in the art.

The Industrial Crane 10 of the present invention, as shown in FIG. 1, includes a rotary oil coupling 30, and an electrical connector 50 of the cylindrical type, connected by a hollow flexible shaft 70, which is rotated by a rotary part of the oil coupling 30 and which in turn rotates a rotary part of the cylindrical electrical connector 50, as will be described hereinbelow. The cylindrical electrical connector 50 will be seen to be in horizontal position, removed from the axis of rotation of the upper works, and therefore providing little or no interference with ground clearance of the vehicular chassis 11.

Referring now to FIG. 2, there is shown a part of the chassis 11 including a structural channel 22, and a mounting bracket 23 of L-shape for mounting the cylindrical electrical connector 50 in horizontal position. Mounted on the upper surface of the chassis 11 is bearing and ring 24, on which is the base plate 25 of the upper works 15. The ring gear is engaged by pinion gear 27, fixed to the upper works 15, so that when the pinion gear 27 is driven, the upper works 15 will rotate about a vertical axis.

Concentrically mounted on the vertical axis of rotation of the upper works 15 is an oil coupling 30, which is of the rotary type, for permitting transfer of hydraulic oil between hydraulic elements carried by the chassis and by the upper works. The hollow flexible shaft 70 is shown connected at the bottom of the rotary coupling 30, with its end which is connected to the rotary oil coupling 30 concentric with the axis of rotation of upper works 15, and with its opposite ends spaced from that axis, and being connected to a rotary part of the cylindrical electrical connector 50. The cylindrical electrical connector 50 is shown somewhat diagrammatically, and may provide for, for example, sixteen electrical circuits.

In FIG. 3, there may be seen the structural member 22 and the mounting brackets 23 attached to it, for supporting the cylindrical electrical connector 50. Also shown is the rotary oil coupling 30, and the hollow flexible shaft 70.

Referring now to FIG. 4, the known cylindrical electrical connector 50 is shown, including a rotary member or drum 51 having a plurality of axially spaced conductor bands 52 extending around the periphery thereof. For each band, there is provided a contact or wiper 53, carried on the end of an arm 54. The arms 54 are supported by posts 56, there being two such posts 56 as shown in FIG. 4. Conductors 57 extend from the arms 54, being in electrical engagement with the wipers or contacts 53 in normal manner. These conductors 57 extend to various electrical components, such as a starter motor for an internal combustion engine carried in the vehicular chassis 11, various lights and solenoids of solenoid-operated valves, a horn, etc. The electrical components are representationally shown and are designated 58, and it will be understood that while six such components have been shown, in practice many more may actually be provided, depending upon the specific construction of the Industrial Crane 10.

The cylindrical electrical conductor 50 has an extension 59 of the drum 51, and telescoped over the extension 59 is end 71 of the hollow flexible shaft 70. A suitable clamp or other coupling may be provided so as to secure the end 71 of hollow shaft 70 in a non-rotational manner to the extension 59 of the rotary drum 51 of cylindrical electrical connector 50. The end 71 is shown in horizontal position, offset from the longitudinal axis of the rotary oil coupling 30, and therefore of the rotational axis of the upper works 15, with which the rotary oil coupling 30 is concentric. The other end 72 of the hollow flexible shaft 70 is connected to an extension 31 of rotary oil coupling 30, and more particularly to a rotary spool 32 thereof. Spool 32 is within stationary casing 33.

The stationary casing 33 is fixedly connected to the chassis 11 by yoke 27 and anchor 29, and the spool 32 is connected to the upper works 15 by screws or the like for rotation therewith. The rotary oil coupling 30 is of known construction, with oil conduits 34 and 35 connected to hydraulic units (not shown) carried by the chassis 11, and connected to the stationary casing 33, the latter having ports through which oil enters and passes into annular groves 36 and 37 in the spool 32. The annular grove 36 is connected with a passage 38, and the annular grove 37 is connected with a passage 39, there being a hose 41 connected to the upper end of the spool 32, and in communication with the passage 38, and a hose 42 similarly connected to the upper end of the spool 32 and in communication with the vertical passage 39. The hoses 41 and 42 are in communication with hydraulic units (not shown) carried in the upper works 15.

A plurality of flexible conductors 75 will be seen extending through the hollow flexible shaft 70, and through an axial passage 43 in the spool 32, passing upwardly and into the upper works 15, the conductors 75 being shown as passing to electrical components, specifically illustrated as switches 76 in each of the individual conductors. Thus, each of the switches is positioned in the operator's cab 16 for actuation by the operator of the Industrial Crane 10. Although the electrical components were illustrated as being switches, it will be understood that other electrical components may be provided, such as gauges for an internal combustion engine carried in the vehicular chassis 11.

The upper works 15 in practice rotates relatively slowly, approximately one and one half RPM, and has been found in practice to average six complete rotations each working day. Therefore, there is very limited bending and stressing of the hollow flexible shaft 70 and of the conductors 75 passing through it, so that these components are suited for withstanding the noted stresses.

The upper works 15 will rotate, and since the spool 32 is attached to it, it will also rotate, and cause rotation of flexible shaft 70, which will thereby rotate the drum 51 of the cylindrical electrical connector 50. The conductor 75 are connected in conventional manner to the conductor bands 52 of the connector 50.

There has been provided an Industrial Crane having provision for the transfer of electrical energy between a rotatable upper works and the chassis by means of a relatively low cost cylindrical electrical connector of conventional construction, while at the same time the electrical connector does not decrease the ground clearance envelope.

It will be obvious to those skilled in the art that various changes may be made without departing from the spirit of the invention, and therefore the invention is not limited to what is shown in the drawings and described in the specification but only as indicated in the appended claims.

I claim:

1. A vehicle comprising:
   (a) a chassis, an upper works, means mounting the upper works for rotation on the chassis about a vertical axis, and means for rotating said upper works,
   (b) cylindrical electrical connector means for tranferring electrical energy between a fixed element and a rotary element and including a fixed part, a rotary part, and axially spaced conductor bands and contacts on said parts,
   (c) means mounting said connector means on said chassis remote from the axis of rotation of the upper works,
   (d) means for rotating said rotary part of said connector means from said upper works,
   (e) flexible electrical conductors extending through a hollow shaft and connected to said connector means and to electrical means on said upper works.

2. The combination of claim 1, said means for rotating the rotary part of the connector means comprising a hollow, flexible shaft.

3. The combination of claim 1, said connector mounting means mounting said connector means with the axis thereof substantially horizontal.

4. The combination of claim 1 or 2, said vehicle further comprising a rotary oil coupling having its axis on the axis of the upper works and comprising a fixed part and a rotary part, means connecting the fixed part to the chassis, means connecting the rotary part to the upper works for movement therewith, conduit means connected to said fixed and rotary parts and means connecting said flexible hollow shaft to the rotary part of the rotary oil coupling.

5. The vehicle of claim 1, said upper works comprising a cab, said vehicle further comprising second electrical means on said chassis, and conductors connecting said last mentioned second electrical means and said contacts of said electrical connector means.

6. A vehicle comprising:
   (a) a chassis supported on longitudinally spaced wheels,
   (b) an upper works rotatable on said chassis,
   (c) electrical components on said upper works and on said chassis,
   (d) means for connecting said electrical components comprising:
      (i) a cylindrical electric connector including a plurality of axially spaced conductor bands and a plurality contacts engaging said bands, said connector comprising a rotary part supporting said bands,
      (ii) a plurality of electrical conductors connected to said components on said upper works and to said conductor bands,
      (iii) a plurality of electrical conductors connected to said contacts and to said electrical components on said chassis,
   (e) means for effecting rotation of said rotary part of said electrical connector, and
   (f) means for mounting said electrical connector on said chassis spaced from the axis of rotation of said upper works.

7. The structure of claim 6, said means for effecting rotation of said rotary part comprising a hollow, flexible shaft having one end coaxial with the axis of rotation of the upper works and the other end spaced from said axis and connected to said rotary part of said electrical connector.

8. The structure of claim 7, said first mentioned plurality of electrical conductors being flexible and extending through said hollow, flexible shaft.

9. The structure of claim 6, said last mentioned means mounting said electrical connector in horizontal position.

10. The vehicle of claim 6, and a rotary oil coupling having a first part fixed to said chassis and a second part fixed to said upper works and rotatable therewith; means mounting said rotary oil coupling with its axis coincident with the axis of rotation of the upper works, and means connecting said one end of said flexible shaft with said second part of rotary coupling.

11. The structure of claim 10, said rotary oil coupling second part having an axial passage therethrough, said first mentioned electrical conductors extending through said axial passage.

12. The structure of claim 10 or 11, and hydraulic hoses connected to said first and second parts of said oil coupling.

* * * * *